United States Patent [19]

Meyer et al.

[11] Patent Number: 4,575,838
[45] Date of Patent: Mar. 11, 1986

[54] SANDWICH-TYPE CAPACITIVE ELECTRONIC DISCS

[75] Inventors: Wolfgang H. Meyer, Urdorf; Hanspeter Schweizer, Mönchaltorf, both of Switzerland

[73] Assignee: RCA Corporation, Princeton, N.J.

[21] Appl. No.: 584,599

[22] Filed: Feb. 29, 1984

[51] Int. Cl.$^4$ ............................ G11B 3/70; G11B 5/84
[52] U.S. Cl. ..................................... 369/276; 156/151; 156/230; 156/242; 264/104; 264/107; 369/126; 428/64; 428/65; 428/908
[58] Field of Search ............... 156/150, 151, 230, 242; 264/107, 104, 259; 369/286, 288, 283, 126, 275, 276; 428/64, 65, 935, 908

[56] References Cited

U.S. PATENT DOCUMENTS

| | | | |
|---|---|---|---|
| 3,842,194 | 10/1974 | Clemens | 178/6.6 A |
| 4,137,550 | 1/1979 | Kaganowicz et al. | 358/128 |
| 4,228,050 | 10/1980 | Martin et al. | 260/23 X |
| 4,275,101 | 6/1981 | Wang et al. | 369/286 |
| 4,330,583 | 5/1982 | Datta et al. | 428/65 |
| 4,355,062 | 10/1982 | Wang et al. | 428/64 |
| 4,363,844 | 12/1982 | Lewis et al. | 369/283 X |
| 4,390,487 | 1/1983 | O'Mara | 264/107 |
| 4,411,826 | 10/1983 | Naarmann et al. | 252/518 |
| 4,412,942 | 11/1983 | Naarmann et al. | 252/518 |
| 4,427,513 | 1/1984 | Skotheim et al. | 204/181 E X |

FOREIGN PATENT DOCUMENTS

| | | |
|---|---|---|
| 2001078A | 1/1979 | United Kingdom . |
| 1571160 | 7/1980 | United Kingdom . |
| 1593332 | 7/1981 | United Kingdom . |

OTHER PUBLICATIONS

Diaz et al., *J. Chem. Soc., Chem. Commun.* 1980, No. 9, pp. 397–398.
Kanazawa et al., *J. Chem. Soc., Chem. Commun.* 1979, No. 19, pp. 854–855.
Diaz et al., *J. Chem. Soc., Chem. Commun.* 1979, No. 14, pp. 635–636.
Street et al., *IBM Technical Report*, 1981, 12 pages.
Kanazawa et al., *Synthetic Metals*, vol. 1, No. 3, pp. 329–336 (1980).
Diaz et al., *IBM J. Res. Develop.*, vol. 27, No. 4, Jul. 1983, pp. 342–347.
Bull et al., *J. Electrochem Soc.*, vol. 129, No. 5, pp. 1009–1015, 1982.
Noufi et al., *J. Electrochem. Soc.*, vol. 128, No. 12, pp. 2596–2599, 1981.
Koezuka et al., *J. Applied Physics*, vol. 54, No. 5, pp. 2511–2516, 1983.
Simon et al., *Am. Chem. Soc.*, vol. 194, No. 7, pp. 2031–2034.
Tourillon et al., *J. Electro. and Chem.*, vol. 135, No. 1, pp. 173–178, 1982.
Diaz et al., "Polypyrroles: An Electrochemical Approach to Conducting Polymers", Ext. Linear Chain Cmpd. Miller, Ed. 417–441 (1983).
Business Week, Apr. 14, 1980—"The Electric Promise of Synmetals".

*Primary Examiner*—Robert A. Dawson
*Attorney, Agent, or Firm*—Birgit E. Morris; R. Hain Swope

[57] ABSTRACT

At least one layer of a conductive organic polymer, formed by electropolymerization on the anode in a two electrode cell, is bonded to a plastic substrate by compression with sufficient heat and pressure to cause it to bond to the substrate and release from the anode. Improved sandwich-type capacitive electronic discs having an information pattern in ultra thin outer conductive layers which are homogeneous and which contain no conductive particles are formed by this process by providing as the anode a mastering disc containing an information pattern which is the negative of the desired information pattern.

20 Claims, No Drawings

SANDWICH-TYPE CAPACITIVE ELECTRONIC DISCS

This invention relates to improved high density information discs having a homogeneous conductive layer and a method for making them.

BACKGROUND OF THE INVENTION

Clemens, in U.S. Pat. No. 3,842,194, discloses a capacitive video disc playback system which includes a high density information record having a conductive surface. Initially, information records for this system were sandwich-type constructions, e.g. the record was formed of a plastic disc coated with a layer of conductive metal which was in turn coated with a dielectric material, such as polystyrene. Subsequently improved information discs for this system were homogeneous and comprised a thermoplastic matrix having embedded therein sufficient finely divided conductive carbon black particles to obtain capacitive playback. Suitable molding compositions for such discs are disclosed in Martin et al U.S. Pat. No. 4,228,050.

Conductive molding compositions, such as described by Martin et al, are comparatively expensive due principally to the amount of high quality, low density, conductive carbon black contained therein. Additional various additives, such as stabilizers, lubricants and the like, in such compositions also contribute to the cost of a disc produced therefrom. Other workers have sought to reduce the cost of such a disc by bonding thin layers of the expensive conductive molding composition onto an inexpensive support or core disc to form a sandwich-type disc.

O'Mara, in U.S. Pat. No. 4,390,487, discloses a method of forming a sandwich-type capacitive electronic disc ("CED") into which the conductive molding composition is injected into a compression mold and a nonconductive core material is injected inside of the conductive plastic to form a preform which is compression molded to form a CED.

Ruda, in copending U.S. patent application Ser. No. 522,332, filed Aug. 11, 1983, discloses a sandwich-type CED having comparatively thin conductive layers, i.e. about 2 to 30 mils thick, which are formed by passing the conductive molding composition, in molten form, between rollers in production calendering equipment or in a two-roll mill. The conductive composition is, in essence, that disclosed by Martin et al.

Dixon et al, in application Ser. No. 556,354, filed Nov. 29, 1983, now abandoned, disclose preparation of a sandwich-type CED by forming a dispersion of conductive carbon black particles in a solution of a thermoplastic resin such as polyvinyl chloride, and certain additives, coating the dispersion onto a core disc and drying to form conductive layers which are then embossed with an information pattern. Di Marco, in application Ser. No. 556,355, filed Nov. 29, 1983, now U.S. Pat. No. 4,515,830, discloses forming a similar dispersion from the heat-treated conductive molding composition disclosed by Martin et al and preparing sandwich-type CED's therefrom in a similar manner. The conductive layers of Dixon et al and DiMarco are substantially thinner than those of Ruda.

The conductive layer in the CED's produced by each of the above methods contains conductive carbon black particles and additives for the processing and stabilization of the thermoplastic resin. In addition to the cost of the conductive carbon, the abrasiveness of molding compositions such as disclosed by Martin et al causes the stampers used to emboss the information pattern in the conductive layer or disc to wear out or score rather quickly and, thus, become unuseable. This adds another cost to the prouction of CED's. There is also to be considered in each instance possible reactions and/or degradations among the various components of the formulation during the heat and pressure of compression molding.

In accordance with this invention, there is provided a method of preparing sandwich-type CED's which have conductive layers at least as thin as those of Dixon et al and DiMarco. The conductive layers of the subject CED's are homogeneous and contain no conductive carbon black or other conductive particles.

SUMMARY OF THE INVENTION

Sandwich-type capacitive electronic discs are prepared by electropolymerization of an organic monomer onto a conventional mastering disc having a negative form of the desired information pattern therein, thereby forming a positive patterned layer of an organic polymer having sufficient conductivity for capacitive playback. The polymer layer is then bonded onto a plastic core disc.

DETAILED DESCRIPTION OF THE INVENTION

The method of this invention is applicable to any organic monomer which can be electropolymerized to form a polymer layer on a metal anode which layer possesses the requisite conductivity for capacitive playback. At the present time, it is required that the conductive layer have a bulk resistivity below about 500 ohm-cm at 900 megahertz. While polymers formed from a number of organic monomers, such as acetylene, benzene or quinoline, do have the requisite conductivity as deposited, only pyrrole has been found by us to be sufficiently stable in the electrically conductive polymerized form to be attractive for use in preparing sandwich-type CED's. Therefore, although the method of this invention is equally applicable to any organic monomer which can be electropolymerized to form a polymer having sufficient conductivity to provide capacitive playback, it will be described specifically with reference to pyrrole.

Polypyrrole has long been recognized as a conductive organic polymer. Formation of conductive films of polypyrrole on the anode in a two electrode cell by electropolymerization is also known. There have been a number of recent studies on the reaction parameters of the formation of polypyrrole films, including free standing films, in this manner and the effect of changes in variable conditions of the reaction on the properties of the films. In addition, certain uses have been proposed for such conductive films in connection with semiconductor processing such as, for example, depositing them on n-type semiconductors as a protection against photoanodic decomposition, as Schottky type diodes and the like. There is nothing in the literature, however, which would suggest that polypyrrole, or any conductive organic polymer, might be useful as the conductive layers in a sandwich-type CED.

There is further nothing in the literature which suggests that such ultrathin films of conductive organic polymer could be cleanly transferred from the anode where they were deposited to the surface of a plastic disc. We have found that this is possible and, further, that an information pattern in the film can be transferred cleanly and without distortion. That such transfer was possible could not have reasonably been predicted from the literature.

In accordance with this invention, it is preferred that polypyrrole be formed from an aqueous medium containing a substantial percentage of an organic solvent. A number of such solvents have been reported in the literature. Acetonitrile, which is frequently mentioned, may be used alone or in combination with other solvents, for example, ethylene glycol and glycerol. It has been found that, for the process of this invention, an aqueous medium containing glycerol is most suitable. In general, the aqueous medium of this invention contains from about 5 to 50, preferably about 20, percent by volume of glycerol. The medium contains, the monomer, i.e. pyrrole, and a suitable electrolyte salt. Generally, the concentration of pyrrole in the medium is between about 0.1 and 1.0, preferably about 0.5 percent by volume.

In general, the use of organic electrolyte salts is preferred for the subject process over inorganic salts such as cupric sulfate or ferrous sulfate. Suitable organic electrolyte salts include tetra-n-butylammonium-tetrafluoroborate (TBABF$_4$) and tetramethylammonium-p-toluenesulfonate (TMATS), with the latter being preferred. The electrolyte salt is suitably present in from about 0.05 to 0.5, preferably about 0.1, molar concentration. The use of these organic electrolyte salts produces a dramatic increase in the conductivity of the polypyrrole film in comparison to inorganic salts such as, cupric sulfate.

In general, the bath temperature during deposition of the polypyrrole conductive layer according to this invention is suitably between about 15° and 25° C. The cell configuration is not particularly critical to the present process and any conventional electrodeposition apparatus can be utilized. The distance between electrodes is suitably from about 30 to 60 mm. The cell current is from about 0.02 and 0.3 in mA/cm$^2$. The higher current, which is preferred because the quality of the conductive layer is improved, is most readily attainable with the above-mentioned organic electrolyte salts.

In accordance with this invention, a conventional metal master disc used to produce commercial CEDs is utilized as the anode in a two-electrode cell. While various metals may be used to prepare the master disc, it is preferred that it be of nickel or an alloy which is predominately nickel. Chromium plated nickel master discs are also particularly suitable for the subject process. By "master disc" is meant a disc having a negative, i.e. a mirror image, pattern of the desired information pattern. The remaining electrode is suitably copper.

In accordance with this invention, the electrolyte solution is deoxygenated in the cell, preferably by nitrogen purge, before the pyrrole is added thereto. Generally, a thirty minute nitrogen flow is sufficient. The pyrrole is then added and current flow initiated. Deposition of black polypyrrole on the anode master disc is carried out for a time sufficient to deposit a layer at least about 0.5 micrometer thick and preferably between about 1.0 and 3 micrometers thick. Most suitably, the polypyrrole layer is about 1.5 micrometers thick. For a 1.5 micrometer thick layer of polypyrrole, a current flow of 50 mA for about one-half hour is generally sufficient where anode and cathode are 60 mm apart.

After deposition is complete, the layer of polypyrrole is dried and washed in an organic solvent such as acetone.

The plastic core disc for the subject sandwich-type CEDs is suitably comprised of a vinyl chloride-based formulation. Such compositions typically contain, in addition to the polymer, lubricants, plasticizers, stabilizers and the like. It is important that the core disc have acceptable surface quality and smoothness to preserve the integrity of the information pattern in the polypyrrole layers.

The subject CEDs are prepared by placing a core disc, preferably having a thickness of about 2 mm, between two master discs, each of which has a coating of polypyrrole, bonding the polyrrole layers to the core disc, thereby releasing the polypyrrole from the master discs. Suitably, a temperature of from about 120° to 160° preferably about 140° C., and a pressure of from about 10 to 20 kg/cm$^2$, preferably about 15 kg/cm$^2$, are utilized. It is considered unexpected that the polypyrrole layers readily separate from the master discs without any distortion and adhere well to the plastic core disc.

It is preferred in accordance with this invention to coat the side of the polypyrrole layer to be bonded to the plastic core disc with a thin layer of a conventional adhesive to enhance bonding. Generally, a latex adhesive such as a polyvinylidene acrylic latex preparation available as Daran 229 from W. R. Grace & Co. is acceptable. The latex adhesive is suitably applied to the polypyrrole layers by spin-coating to achieve an even coating. The thus-formed CEDs have been found to separate readily from the master disc with no distortion of the information pattern.

The polypyrrole conductive layers have a conductivity of between about $1 \times 10^2$ and $5 \times 10^3$ S/m, which is equivalent to a bulk resistivity of between about 0.02 to 1 ohm/cm. This is well within the maximum requirement for playback, i.e. a bulk resistivity below about 500 ohm-cm at 900 megahertz. The high conductivity of the conductive layers of the subject sandwich CEDs is such that some instability, e.g. a loss of up to 20 percent of conductivity, which has been observed upon storage under stressed conditions, can be tolerated.

CEDs prepared in accordance with this invention will produce acceptable video and audio reproduction upon capacitive playback in the as-pressed condition. It is preferred, however, to coat the subject CEDs with a lubricant such as is utilized in conventional CEDs. Suitable lubricants include fractionated methylalkyl siloxane preparations such as disclosed in U.S. Pat. No. 4,277,101, issued June 23, 1981, preferably doped with an additive such as disclosed in U.S. Pat. No. 4,330,583, issued May 18, 1982, or U.S. Pat. No. 4,355,062, issued Oct. 19, 1982.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

A solution was formed by dissolving 2.15 g of cupric sulfate in 135 ml of distilled water at 20°. To this solution was slowly added 0.56 ml of pyrrole and the resultant solution was charged to a suitable electrolysis cell having a copper plate as the cathode and a nickel plate as the anode. Each plate had an area of about 15 square centimeters. A voltage of 0.5 volt was applied across the cell. The current density was about 0.15 mA/cm$^2$. These conditions were maintained for about two hours during which a film of polypyrrole approximately two micrometers thick deposited at the anode. The film, which separated readily from the plate, was washed in deionized water and dried under vacuum.

Two films of polypyrrole were individually prepared as above with the exception that the anode was replaced with a nickel mastering disc of the type used to make capacitive electronic discs. Current flow was maintained for two hours during which the mastering disc received a layer of polypyrrole 2 micrometers thick.

A nonconductive core disc, 2 mm thick, comprised of a poly(vinyl chloride) resin, plasticizers and stabilizers was placed between the polypyrrole sheets in a conventional compression molding press. In order to improve adhesion to the nonconductive core disc, each sheet was coated with the latex emulsion Daran 229, available from W. R. Grace & Co. The press, which was heated to 140°, was partially closed to soften the sheets and to allow air to escape. The mold was completely closed and held for four minutes at 140°. The resultant capacitive electronic disc easily separated from the mastering discs upon cooling and had sufficient conductivity to be played on a conventional capacitive electronic disc player, i.e. its resistivity was less than 1.0 ohm-cm.

EXAMPLE 2

As an electrolyte salt, 98.14 g of tetramethylammonium-p-toluenesulfonate was dissolved in 3200 ml of distilled water at 25°. A total of 800 ml of glycerol was added thereto and the mixture deoxygenated by purging with a nitrogen stream for thirty minutes. The concentration of tetramethylammonium-p-toluenesulfonate in the solution was 0.1M. After deoxygenation was completed, 16.7 ml of pyrrole was added to the solution with stirring under a nitrogen atmosphere.

The mixture was placed in an electrolysis cell as in Example 1. A nickel mastering disc of the type used to prepare capacitive electronic discs was utilized as the anode. The cathode was a copper plate as in Example 1. A constant current of 50 mA was passed through the cell for 45 minutes during which a 1.9 micrometers thick film of polypyrrole formed on the anode. The electrolyte solution was maintained under a nitrogen atmosphere during deposition of the film. The film was washed with acetone and dried.

Two films formed as above were pressed onto a nonconductive core disc as described in Example 1. The resultant capacitive electronic disc, which separated readily from the mastering discs, was demonstrably superior in playback and other desirable properties to the disc formed in Example 1. The bulk resistivity of the polypyrrole layer after lamination was between 0.02 and 0.10 ohm-cm. The disc was clearly superior to that formed in Example 1 in terms of stability and retention of conductivity.

Discs prepared by this method produced an acceptable picture upon playback in the as-pressed state. However, in each instance, the quality of both the picture and sound reproduction was improved by coating the disc with a thin layer of a doped, fractionated methylalkylsiloxane lubricant.

We claim:

1. A method of forming a structure comprising a plastic substrate having on a surface a layer of a conductive organic polymer, said method comprising electropolymerizing a composition comprising a suitable organic monomer, an electrolyte salt and a suitable solvent to form said conductive layer on the anode in a two electrode cell and compressing the coated anode against the substrate with sufficient heat and pressure to cause the layer to bond to the substrate and release from the anode.

2. A method in accordance with claim 1, wherein said structure is a high density information disc, said polymer layer contains an information pattern and is sufficiently conductive to provide capacitive playback, said anode is a mastering disc having on its surface a pattern which is a negative of the desired information pattern in said conductive polymer layer, and said substrate is a plastic core disc.

3. A method in accordance with claim 1, wherein said monomer is pyrrole.

4. A method in accordance with claim 2, wherein conductive layers are bonded to both sides of said plastic core disc.

5. A method in accordance with claim 2, wherein said mastering disc is nickel or an alloy thereof.

6. A method in accordance with claim 2, wherein said mastering disc is nickel or an alloy thereof having a thin layer of chromium thereover.

7. A method in accordance with claim 2, wherein said conductive layer has a thickness of at least about one-half micrometer.

8. A method in accordance with claim 7 wherein said conductive layer has a thickness between about 1 and 3 micrometers.

9. A method in accordance with claim 7, wherein said conductive layer has a thickness of about 1.5 micrometers.

10. A method in accordance with claim 1, wherein said electrolyte salt is an organic salt.

11. A method in accordance with claim 10, wherein said electrolyte salt is tetramethylammonium-p-toluenesulfonate.

12. A method in accordance with claim 3, wherein said solvent is a mixture of water and from about 5 to about 50 percent by volume of glycerol.

13. A method in accordance with claim 12, wherein said solvent is a mixture of water and 20 percent by volume of glycerol.

14. A method in accordance with claim 3, wherein said composition is purged to remove oxygen before deposition of said conductive layer.

15. A method in accordance with claim 1, wherein said conductive layer is coated with an adhesive prior to bonding to the plastic core disc.

16. A method in accordance with claim 15 wherein said layer is coated with the adhesive by spin-coating.

17. A high density information disc suitable for capacitive playback comprising a plastic core disc having on at least one major surface thereof a conductive layer containing an information pattern, said layer being formed by the electro-polymerization of pyrrole onto a substrate having a surface relief pattern which is the negative of said information pattern, thereby producing said information pattern in said layer as it is formed, said layer being free of particulate filler.

18. An information disc in accordance with claim 17, wherein the core disc has a conductive layer on both major surfaces.

19. An information disc in accordance with claim 17, wherein the conductive layer has a thickness of between about one-half and three micrometers.

20. An information disc in accordance with claim 19, wherein the conductive layer has a thickness of about one and one-half micrometers.

* * * * *